United States Patent
Kneuper et al.

(10) Patent No.: US 9,672,745 B2
(45) Date of Patent: Jun. 6, 2017

(54) AWARENESS ENHANCING DISPLAY FOR AIRCRAFT

(71) Applicant: Cessna Aircraft Company, Wichita, KS (US)

(72) Inventors: Jeremy Joseph Kneuper, Hesston, KS (US); Isaac Wayne Stanfield, Wichita, KS (US); Jason Michael Decker, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 77 days.

(21) Appl. No.: 14/643,571

(22) Filed: Mar. 10, 2015

(65) Prior Publication Data

US 2015/0348420 A1    Dec. 3, 2015

Related U.S. Application Data

(63) Continuation-in-part of application No. 14/642,256, filed on Mar. 9, 2015.

(60) Provisional application No. 61/951,189, filed on Mar. 11, 2014, provisional application No. 61/951,260, filed on Mar. 11, 2014, provisional application No. (Continued)

(51) Int. Cl.
| | | |
|---|---|---|
| *G08B 23/00* | (2006.01) | |
| *G08G 5/00* | (2006.01) | |
| *B64D 43/00* | (2006.01) | |
| *G01C 23/00* | (2006.01) | |
| *G06F 3/0481* | (2013.01) | |
| *G06F 3/0484* | (2013.01) | |

(52) U.S. Cl.
CPC ............ *G08G 5/0021* (2013.01); *B64D 43/00* (2013.01); *G01C 23/00* (2013.01); *G06F 3/0481* (2013.01); *G06F 3/04817* (2013.01); *G06F 3/04847* (2013.01); *G01C 23/005* (2013.01); *G08G 5/0052* (2013.01)

(58) Field of Classification Search
CPC ....... G06F 17/211; G09B 17/04; B64D 43/00; G08G 5/0021
USPC ......................... 340/963; 345/173; 701/3, 14
See application file for complete search history.

(56) References Cited

U.S. PATENT DOCUMENTS

| | | |
|---|---|---|
| 5,272,652 A | 12/1993 | Rosenshein et al. |
| 6,259,981 B1 | 7/2001 | Wilcosky |
| | (Continued) | |

OTHER PUBLICATIONS

U.S. Appl. No. 14/643,510, Office Action dated Feb. 18, 2016, 24 pages.

(Continued)

*Primary Examiner* — John A Tweel, Jr.
(74) *Attorney, Agent, or Firm* — Erise IP, P.A.

(57) ABSTRACT

Systems, methods and computer-storage media are provided for enhancing awareness in an aircraft using a touch-screen instrument panel. In one aspect, a warning is displayed peripherally in the panel in a way that attracts attention without interfering with the use of the panel for other purposes. In another aspect, a crew member is directed by highlighting through menus to a screen that enables the problem causing the warning to be corrected. In another aspect, parameters (e.g., temperatures, pressures) are displayed along with oriented graphical representations of system components. In yet another aspect, aircraft parameters are displayed in a historical context so that the user has a time-line context for a value at issue.

24 Claims, 10 Drawing Sheets

Related U.S. Application Data

61/951,231, filed on Mar. 11, 2014, provisional application No. 61/951,240, filed on Mar. 11, 2014, provisional application No. 61/951,243, filed on Mar. 11, 2014, provisional application No. 61/951,157, filed on Mar. 11, 2014, provisional application No. 61/951,168, filed on Mar. 11, 2014, provisional application No. 61/951,201, filed on Mar. 11, 2014, provisional application No. 61/951,152, filed on Mar. 11, 2014, provisional application No. 61/951,195, filed on Mar. 11, 2014, provisional application No. 61/951,208, filed on Mar. 11, 2014, provisional application No. 61/951,220, filed on Mar. 11, 2014, provisional application No. 61/951,234, filed on Mar. 11, 2014, provisional application No. 61/951,166, filed on Mar. 11, 2014, provisional application No. 61/951,215, filed on Mar. 11, 2014, provisional application No. 61/951,253, filed on Mar. 11, 2014, provisional application No. 61/951,216, filed on Mar. 11, 2014, provisional application No. 61/951,223, filed on Mar. 11, 2014, provisional application No. 61/951,145, filed on Mar. 11, 2014.

(56) References Cited

U.S. PATENT DOCUMENTS

| | | | | |
|---|---|---|---|---|
| 6,757,521 | B1 | 6/2004 | Ying | |
| 7,262,707 | B2 * | 8/2007 | Kaoh | G09F 9/33 340/539.1 |
| 7,343,232 | B2 | 3/2008 | Duggan et al. | |
| 7,398,083 | B2 | 7/2008 | Ying | |
| 7,693,624 | B2 | 4/2010 | Duggan et al. | |
| 7,734,287 | B2 | 6/2010 | Ying | |
| 7,961,135 | B2 | 6/2011 | Smith et al. | |
| 8,068,049 | B2 | 11/2011 | Salmon et al. | |
| 8,068,950 | B2 | 11/2011 | Duggan et al. | |
| 8,082,074 | B2 | 12/2011 | Duggan et al. | |
| 8,103,398 | B2 | 1/2012 | Duggan et al. | |
| 8,116,759 | B2 | 2/2012 | Ying | |
| 8,321,083 | B2 | 11/2012 | Beebe et al. | |
| 8,355,834 | B2 | 1/2013 | Duggan et al. | |
| 8,437,906 | B2 | 5/2013 | Yukawa et al. | |
| 8,462,018 | B1 | 6/2013 | Shepherd et al. | |
| 8,472,942 | B2 | 6/2013 | Ying | |
| 8,497,784 | B1 | 7/2013 | Vandrovec | |
| 8,527,133 | B2 | 9/2013 | Guilley et al. | |
| 8,600,675 | B1 | 12/2013 | Borghese et al. | |
| 8,660,718 | B2 * | 2/2014 | Holder | G08G 5/0021 701/14 |
| 8,768,555 | B2 | 7/2014 | Duggan et al. | |
| 9,108,729 | B2 | 8/2015 | Duggan et al. | |
| 9,245,242 | B2 * | 1/2016 | Arnold | G06Q 10/06 |
| 2001/0035832 | A1 | 11/2001 | Block | |
| 2003/0156046 | A1 | 8/2003 | Dwyer | |
| 2004/0140959 | A1 | 7/2004 | Matsumura et al. | |
| 2004/0199307 | A1 | 10/2004 | Kipersztok et al. | |
| 2004/0236481 | A1 | 11/2004 | Saint-Aroman et al. | |
| 2007/0130591 | A1 | 6/2007 | Brady, Jr. et al. | |
| 2008/0172268 | A1 | 7/2008 | Wingenter | |
| 2008/0221825 | A1 | 9/2008 | Nyffenegger et al. | |
| 2009/0112380 | A1 | 4/2009 | Nutaro et al. | |
| 2009/0265393 | A1 | 10/2009 | Yukawa et al. | |
| 2010/0063754 | A1 | 3/2010 | Thomas et al. | |
| 2010/0141482 | A1 | 6/2010 | Wyatt et al. | |
| 2010/0194602 | A1 | 8/2010 | Engels et al. | |
| 2010/0211237 | A1 | 8/2010 | Nichols et al. | |
| 2010/0231418 | A1 | 9/2010 | Whitlow et al. | |
| 2010/0250030 | A1 | 9/2010 | Nichols et al. | |
| 2010/0262442 | A1 | 10/2010 | Wingenter | |
| 2011/0126119 | A1 | 5/2011 | Young et al. | |
| 2011/0193694 | A1 | 8/2011 | Bowden et al. | |
| 2011/0241901 | A1 | 10/2011 | Firra | |
| 2012/0026190 | A1 | 2/2012 | He et al. | |
| 2013/0021173 | A1 | 1/2013 | Huang et al. | |
| 2013/0076540 | A1 | 3/2013 | McLoughlin et al. | |
| 2013/0162632 | A1 | 6/2013 | Varga et al. | |
| 2013/0197725 | A1 | 8/2013 | O'Dell et al. | |
| 2013/0197739 | A1 | 8/2013 | Gallagher et al. | |
| 2013/0245860 | A1 | 9/2013 | Cooper | |
| 2013/0339795 | A1 | 12/2013 | Petri et al. | |
| 2014/0285661 | A1 | 9/2014 | Feyereisen et al. | |
| 2014/0300555 | A1 * | 10/2014 | Rogers | G06F 3/0488 345/173 |
| 2015/0262545 | A1 | 9/2015 | Kneuper et al. | |
| 2015/0352952 | A1 | 12/2015 | Kneuper et al. | |

OTHER PUBLICATIONS

International Search Report and Written Opinion issued in PCT/US2015/019437, Jun. 18, 2015, 14 pages.

\* cited by examiner

AWARENESS ENHANCING DISPLAY FOR AIRCRAFT

CROSS REFERENCE TO RELATED APPLICATIONS

This application is a continuation-in-part of U.S. patent application Ser. No. 14/642,256, entitled "Touch Screen Instrument Panel", filed Mar. 9, 2015, which claims the benefit of each of U.S. Provisional Application No. 61/951,145, entitled "3D Weather", U.S. Provisional Application No. 61/951,189, entitled "HD Camera", U.S. Provisional Application No. 61/951,260, entitled "Adjustable Synthetic Vision System", U.S. Provisional Application No. 61/951,231, entitled "Skytrak Navigational Aid", U.S. Provisional Application No. 61/951,240, entitled "Smart Airport Application", U.S. Provisional Application No. 61/951,243, entitled "Smart Traffic Application", U.S. Provisional Application No. 61/951,157, entitled "Chart Synoptic Window", U.S. Provisional Application No. 61/951,168 entitled "Flight Planning Synoptic Window", U.S. Provisional Application No. 61/951,201 entitled "Intelligent Radio Frequency Identifiers", U.S. Provisional Application No. 61/951,152, entitled "Crew Alerting System", U.S. Provisional Application No. 61/951,195 entitled "Historical Data Feature", U.S. Provisional Application No. 61/951,208 entitled "Maintenance Synoptic Window", U.S. Provisional Application No. 61/951,220 entitled "Master Warning/Master Caution", U.S. Provisional Application No. 61/951,234 entitled "Proximity Icon", U.S. Provisional Application No. 61/951,166 entitled "Flight Control Synoptic Window", U.S. Provisional Application No. 61/951,215 entitled "Mode Controller and Engine Indication Icon", U.S. Provisional Application No. 61/951,253 entitled "Synoptic Window Layout", U.S. Provisional Application No. 61/951,216 entitled "Moveable Synoptic Pages", U.S. Provisional Application No. 61/951,223 entitled "Pinnable Synoptic Pages", all filed Mar. 11, 2014. The entireties of each of the aforementioned applications are incorporated by reference herein.

BACKGROUND

Conventional crew alerting systems display simple text messages descriptive of a particular system problem on a device located on an aircraft control panel. Additionally, illuminated pushbuttons provide crew alerts for different kinds of caution or warning faults. Assuming the nature of the problem can be identified, the pilot typically references a book or other materials to look up the procedures necessary to rectify the situation if he or she cannot remember a solution.

In terms of parameters of interest (i.e., pressures, temperatures, and speeds), the conventional cockpit instruments display current values only. This fails to give the flight crew any sense of historical context for the value displayed.

SUMMARY

This summary is provided to introduce a selection of concepts in a simplified form that are further described below in the Detailed Description. This summary is not intended to identify key factors or essential features of the claimed subject matter, nor is it intended to be used as an aid in determining the scope of the claimed subject matter.

In various embodiments, methods for increasing awareness of users, e.g., a pilot or crew member, are provided. In one aspect, the method alerts the aircraft crew of a relevant condition. The method in one embodiment consists of receiving information from an aircraft warning system regarding a condition, displaying an awareness-enhancing indication on a touchscreen display in an aircraft cockpit. Further, the awareness-enhancing indication is communicated to the pilot or crew member in a way that suggests a need to investigate the existence of the condition. Finally, the awareness-enhancing indication is located peripherally on the display, at the margins in some embodiments.

In another aspect, the method involves receiving information regarding a real-time value for an aircraft-parameter (e.g., the parameter being relevant to a condition of an aircraft system). Then, a window including graphic representative of an aircraft component relevant to the parameter is displayed such that it is accompanied with a real-time value of the aircraft-parameter proximate the graphic.

In another aspect, the method could generate an awareness-enhancing indication on a display in response to an alert regarding a condition, where the condition regards a real-time value of a parameter on an aircraft. Further, a menu item is highlighted, and the menu item enables a crew member to bring up a window displaying an option for changing the condition. In some versions, the option for changing is presented in the form of an action button.

In yet another aspect, the method involves receiving information regarding a real-time value for an aircraft-parameter where the parameter is relevant to a condition in an aircraft system. Then the real-time value is communicated to a user in a historical context (e.g., using a time-line representation in a chart).

Systems are also disclosed. In one embodiment, the system includes a touch-screen device incorporated into an aircraft cockpit. The touch-screen is arranged to interface with a computer on the aircraft. The computer receives information regarding a parameter relating to a condition in one of an electrical or a mechanical system. Then, a first process operating on the computer displays a graphic related to the condition. Then, a second process enables the user to institute a corrective action regarding the condition.

Further embodiments and aspects will become apparent by reference to the drawings and by study of the following detailed description.

BRIEF DESCRIPTION OF THE DRAWINGS

Illustrative embodiments of the present invention are described in detail below with reference to the attached figures, which are incorporated by reference herein and wherein.

DETAILED DESCRIPTION

Figure 1:
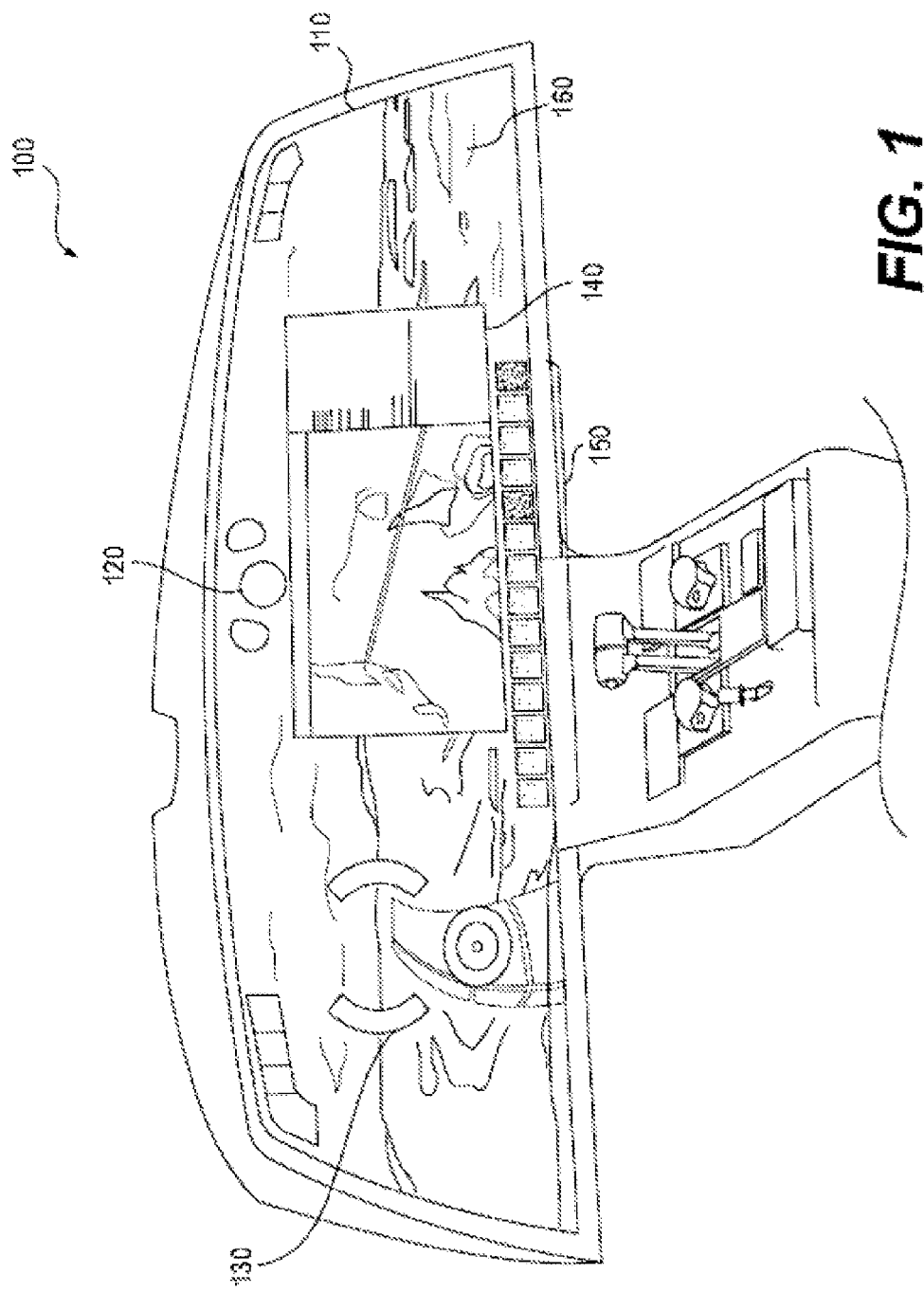
FIG. 1 depicts a perspective view of an embodiment of a touch-screen instrument panel system for an aircraft.

Referring to FIG. 1, a representation 100 of a touch-screen instrument panel (TSIP) is illustrated. The TSIP replaces the plurality of instruments, dials, gauges, and screens typically utilized on the console of an aircraft. The TSIP is configured for at least a touch screen implementation. In some embodiments, the TSIP may span the width of a cockpit of an aircraft. As illustrated in FIG. 1, the TSIP is the width of the cockpit and may be accessed by both a pilot, co-pilot, and the like.

The TSIP is a digital information panel and may include a plurality of digital layers. The digital layers may overlay one another to create multiple views. For instance, and as will be described in further detail below, one layer may be a real-time view while another layer may be a three-dimensional representation of, for example, weather while another layer may include flight instruments and may not be obstructed with any other layers or representations. A processor, similar to that onboard computer 201 of FIG. 2, for example, may stack the plurality of digital images to provide a complete real-time image including the real-time view and any other additional information stacked on top of it as deemed appropriate by the user. Additional information may include synthetic vision, three-dimensional weather, information regarding traffic or airports, etc. Furthermore, the TSIP may be configured such that, in the event of a failure or malfunction of the TSIP, each digital layer becomes transparent so that the standby flight instruments are accessible/viewable to users.

Turning back to FIG. 1, the representation 100 includes the TSIP 110, one or more flight instrument displays 120, one or more navigational displays 130, one or more user interface panels 140, a menu 150, and the real-time view 160. Initially, the real-time view displayed by the TSIP may be captured by a high-definition (HD) camera on the exterior of the aircraft. In an embodiment, the HD camera is mounted to the nose of the aircraft. The camera may be mounted in any appropriate position to capture a real-time view that gives a display of a view ahead of an aircraft. Additionally, as will be further discussed herein, the real-time view may be altered or enhanced by, for instance, synthetic vision enhancements.

The TSIP 110 further includes one or more flight instrument displays 120. The flight instrument display 120 may be configured to include any necessary information regarding the current configuration of the aircraft. Additionally, the flight instrument display 120 may be identically reproduced such that a plurality of users have easy access to the one or more flight instrument displays 120. By way of example, the flight instrument display 120 illustrated in FIG. 1 may be identically reproduced and positioned on the opposite side of the TSIP 110.

The TSIP 110 further includes one or more navigational displays 130. Similar to the one or more flight instrument displays 120, the one or more navigational displays 130 may be positioned anywhere within the TSIP 110. Additionally, the one or more navigational displays 130 may be reproduced for ease of access for multiple users. Given the size of the TSIP 110, the reproduction may be convenient when there is more than one user requiring access to the one or more navigational displays 130.

The TSIP 110 may include one or more user interface panels 140. The one or more user interface panels 140 may be displayed alone or in combination with other panels. The panels 140 display information and accept input from a user regarding various aircraft systems. Exemplary panels provide information regarding, but not limited to, anti-icing systems, environmental control systems, electrical systems, flight controls, hydraulic systems, cabin pressurization systems, interior and exterior lighting, propulsion systems, cabin window shades, weather maps, charts, maps, alerts, system information notifications, maintenance notifications, flight plans, traffic alerts, etc. Depending on the information displayed, the user interface panels may be presented automatically (e.g., without user input) or upon receipt of a user input.

The TSIP 110 may further include a menu 150. The menu may include one or more selectors to aid a user in navigating the TSIP 110. For example, the menu 150 may include a weather indicator that provides a weather informational pop-up. The menu 150 may also include a charts indicator to access various charts. Any feature that may be accessed via the TSIP may be represented in the menu 150. Various features will be described herein and in several of the applications related by subject matter, referenced above, and herein incorporated by reference in their entirety.

Additionally, the TSIP 110 may include a real-time view 160. The real-time view 160 may be an ahead-type view illustrating the view ahead of an aircraft. The real-time view 160 may be captured, as previously mentioned, by a camera mounted to the aircraft. The real-time view 160 may be a real-time panoramic view. Panoramic, as used herein, refers to a wide-angle view. In additional embodiments, infrared imaging may be used in the real-time view to aid in navigation at night, for instance.

Figure 2:
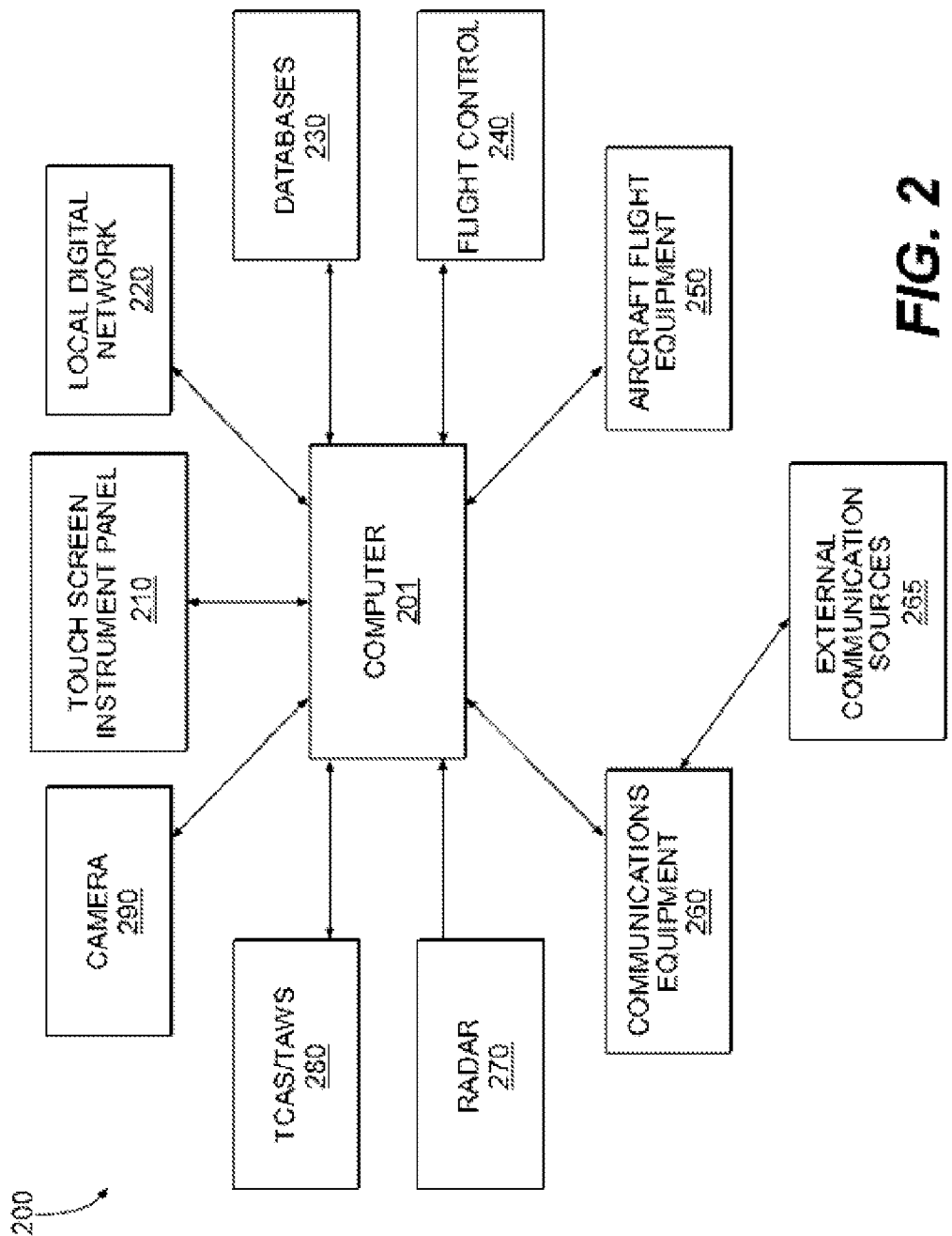
FIG. 2 depicts a system diagram for an embodiment of a touch-screen instrument panel system for an aircraft.

FIG. 2 shows one embodiment of a system environment 200 including an aircraft touch-screen instrument panel 210. System environment 200 has a network of subsystems that includes an on-board computer 201, the touch-screen instrument panel (TSIP) 210, a local digital network 220, databases 230, a flight controller 240, aircraft flight equipment 250, communications equipment 260, radar 270, an anti-collision and terrain awareness 280, and a camera 290. Communications equipment 260 communicates with external communication sources 265, which are not physically located onboard the aircraft (for example, terrestrial communications, satellites, and other aircraft). TSIP 210 interacts with the subsystems of system environment 200 through computer 201.

On-board computer 201 includes for example non-volatile memory, software, and a processor. TSIP 210 serves as a user interface for computer 201. Memory stores software that includes machine readable instructions, that when executed by processor provide control and functionality of system environment 200 as described herein. Computer 201 has for example electronic circuitry including relays and switches to electrically connect with components of system environment 200. In an embodiment, computer 201 includes a first computer and a second computer located on-board the aircraft, where the second computer mirrors the first computer, thereby providing redundancy in the event of a computer failure. It should be recognized that where a single computing device (e.g., computer 201) is represented graphically, the component might be represented by multiple computing units in a networked system or have some other equivalent arrangement which will be evident to one skilled in the art.

TSIP 210 provides a user interface for visualizing and controlling subsystems of system environment 200 through computer 201. TSIP 210 includes a substrate that supports a display and a touch membrane. Substrate is a transparent material such as glass, acrylic, polycarbonate or other approved for flight materials on which display and touch membrane are overlaid. In an embodiment, substrate is made of flexible material for conforming to aircraft cockpit dimensions, including complex shapes such as curves or corners. In an embodiment, the substrate has a large aspect ratio for providing panoramic images. Display is for example an organic light-emitting diode (OLED) display, which is thin and flexible for layering onto substrate. When unpowered, display is, in some embodiments, transparent. Touch membrane is a thin, transparent and flexible material that is layered onto a display and capable of sensing touch. Touch membrane is for example a resistive, capacitive, optical, or infrared touchscreen. Together, touch membrane and display provide TSIP 210 with a visual display that a user may control by touching with one or more fingers or a stylus. Such a touch comprises a touch input to the TSIP 210. In some embodiments, TSIP 210 is a multi-touch display that allows multiple users to touch and interact with the TSIP 210 simultaneously. For example, in some embodiments, both a pilot and a co-pilot may simultaneously touch and interact with TSIP 210 through different windows or controls displayed on TSIP 210.

Local digital network 220 provides a digital connection between computer 201 and on-board subsystems, such as cabin management subsystem (CMS) and in-flight entertainment (IFE). CMS includes for example cabin lighting, heating, air conditioning, water temperature, and movement of shades. IFE includes for example audio and video content. TSIP 210 provides an interface for monitoring and controlling CMS and IFE over local digital network 220.

Databases 230 are digital databases stored in memory of computer 201 on-board the aircraft. Databases 230 include charts, manuals, historical aircraft component data, and checklists Databases 230 allow pilots to quickly access and search information via computer 201. TSIP 210 displays the information such that pilots maintain a heads-up view while piloting an aircraft. Historical aircraft component data is for example updated during flight with data from aircraft flight equipment 250 (e.g., sensors) via computer 201.

Flight controller 240 provides navigation, avionics, and autopilot functions. In an embodiment, flight controller 240 is a standalone unit supplied by an independent manufacturer (e.g., Garmin, Honeywell, Rockwell Collins). TSIP 210 displays aircraft information from flight controller 240 via computer 201 such as airspeed, altitude, heading, yaw, and attitude (i.e., pitch and bank).

Aircraft flight equipment 250 includes flight control surfaces, engines, anti-icing equipment, lights, and sensors (e.g., temperature, pressure, electrical). Aircraft flight equipment 250 is monitored and controlled by pilots using TSIP 210 through computer 201 for flying the aircraft.

Communications equipment 260 allows pilots to communicate with one another, with passengers, and with airports and other aircraft. Communications equipment 260 includes radios, phones, and internal and external digital networks (e.g., Internet and Intranet). Different frequency bands are used for example to transmit and receive data with multiple recipients. TSIP 210 allows pilots to communicate with others by using communications equipment 260 via computer 201.

Communications equipment 260 includes a transceiver configured to communicate with external communication sources 265, which include for example terrestrial based communication towers, satellites, and other aircraft. External communication sources 265 also provide communications with for example radio, global positioning system (GPS), and Internet. TSIP 210 provides a user interface for communicating with external communication sources 265, enabling a pilot or co-pilot to communicate with air traffic control, terrestrial communication towers (e.g., navigation towers, waypoints), satellites, and directly with other aircraft for example. TSIP 210 allows pilots to receive and transmit external communications through communications equipment 260 and computer 201.

Satellites provide network links for phone and internet communications, and GPS information. Aircraft interact with satellites using communications equipment 260 to transmit and receive radio frequency signals. TSIP 210 allows pilots to communicate via satellites through computer 201 and communications equipment 260.

Other aircraft within view of camera 290 are displayed in real-time on a panoramic view provided by TSIP 210. Information about other aircraft, which may be retrieved from radar 270 or radio communication, is displayed for improved pilot awareness and ease of contact.

Radar 270 includes equipment for determining a location and speed of objects from radio waves. Equipment for radar 270 includes a radio transmitter for producing pulses of radio waves and an antenna for receiving a reflected portion of the radio waves from nearby objects. TSIP 210 receives information from radar 270 via computer 201 and uses the information to display the location of nearby objects, such as weather, terrain and other aircraft.

Anti-collision and terrain awareness 280 includes a traffic collision avoidance subsystem (TCAS) and a terrain awareness and warning subsystem (TAWS). Anti-collision and terrain awareness 280 includes radar 270 and transponder information to determine aircraft position relative to other aircraft and Earth terrain, and to provide appropriate warning signals. TSIP 210 displays these warnings and allows pilots to respond to them by, for example, silencing an audible warning signal.

Camera 290 provides forward looking images to TSIP 210 through computer 201. Camera 290 is mounted for example under the aircraft nose. In alternative embodiments, camera 290 is located on the tail or on aircraft wings. Camera 290, in embodiments, receives one or both of visible as well as infrared (IR) light. Further, in embodiments, camera 290 provides high-definition (HD) quality images (e.g., using an HD capable camera). In a preferred embodiment, camera 290 provides HD quality and IR functionality. Alternatively, camera 290 might include two separate cameras, one for HD quality and a second camera for IR imaging.

Camera 290 provides images to computer 201, which renders the images for real-time projection on TSIP 210. TSIP 210 projects HD panoramic views looking forward and below from the front of the aircraft. The forward view spans an angle of about 120° to about 180° for example. In an embodiment, TSIP 210 uses IR imaging to project a synthetic view, which is for example useful at night or when flying through clouds or fog that obscure visible light.

Various components of the user interface displayed on TSIP 210 are designed to provide a synoptic view of the state or condition of the aircraft, meaning that the user interface components provide an intuitive, broad view of the aircraft, its various components and subsystems, and their configuration, condition, and status. The user interface utilizes the touch screen functionality of the TSIP 210 to present views of the aircraft to intuitively communicate information and accept input from the pilot. In some embodiments, the views also include graphical depictions of all or a relevant portion of the aircraft. In some embodiments, the views of the aircraft also incorporate display elements, including without limitation graphical, textual, and numerical elements, in conjunction and associated with graphical depictions of the aircraft to convey the state of the aircraft and to simultaneously convey multiple pieces of information to the pilot or user. The graphical, textual, and numerical elements of the user interface may flash, change color, change content, appear, disappear, move or change location, or otherwise change in response to user input or the state of the aircraft systems. The varying colors, values, or appearances of the display element symbolize or represent the state of the aircraft and its various systems. Some of the display elements may function as input elements such as buttons or text or number entry fields, receiving input from a user through TSIP 210.

The computer 201 monitors the aircraft's data buses to determine the positions, temperatures, pressures, and states of various equipment and systems of the aircraft. TSIP 210 graphically displays the data gleaned from the buses and stored in computer 201 in the appropriate synoptic panels or windows for flight crew interaction. The inventive user interface provides a thorough, easily understood, intuitive and user-friendly interaction with each synoptic user interface. The touch screen functionality of TSIP 210 also allows the user to activate aircraft systems and change configuration settings through user interface displayed on TSIP 210.

The user interface provides for a variety of user interface elements grouped into a variety of "windows", which may also be referred to as "panels" or "pages". Some user interface elements are common to a plurality of the synoptic user interface panels. For example, each user interface panel may comprise a border surrounding the information displayed in the user interface and defining a "panel". A title for each user interface may be displayed within the panel or on the border of the panel area. In some embodiments, the title is displayed in the top or the bottom left or right corner of the panel. The title may optionally be displayed as an abbreviation. Similar to other known graphical user interfaces, each "window" or "panel" may be provided with controls for closing or minimizing the panel to remove it from active display on the TSIP 210. Various embodiments of the panels that are presented in TSIP 210 are described in relation to FIGS. 6 through 10.

In some embodiments of the user interface, a silhouette, cross-section, or other diagram of an aircraft is utilized to illustrate the state of the aircraft and convey relevant information to the pilot. The diagram of an aircraft may be a top, bottom, side, front, back, or perspective view of an aircraft. The windows may incorporate both static elements and active controls. Static elements comprise elements that are fixed or are updated automatically by the system to display the current aircraft configuration and status. Active controls may be updated automatically by the system to display the current aircraft configuration and status, but are also capable of interacting with the user via TSIP 210 to receive pilot input.

In aspects, the systems and methods disclosed provide for improved situational awareness for the crew of the aircraft. In one aspect, the system improves awareness using awareness-enhancing indications, which are displayed on the touchscreen arrangement. An "awareness-enhancing indication" as used herein can be any representation made that enhances the awareness of any element of the TSIP.

Figure 3:
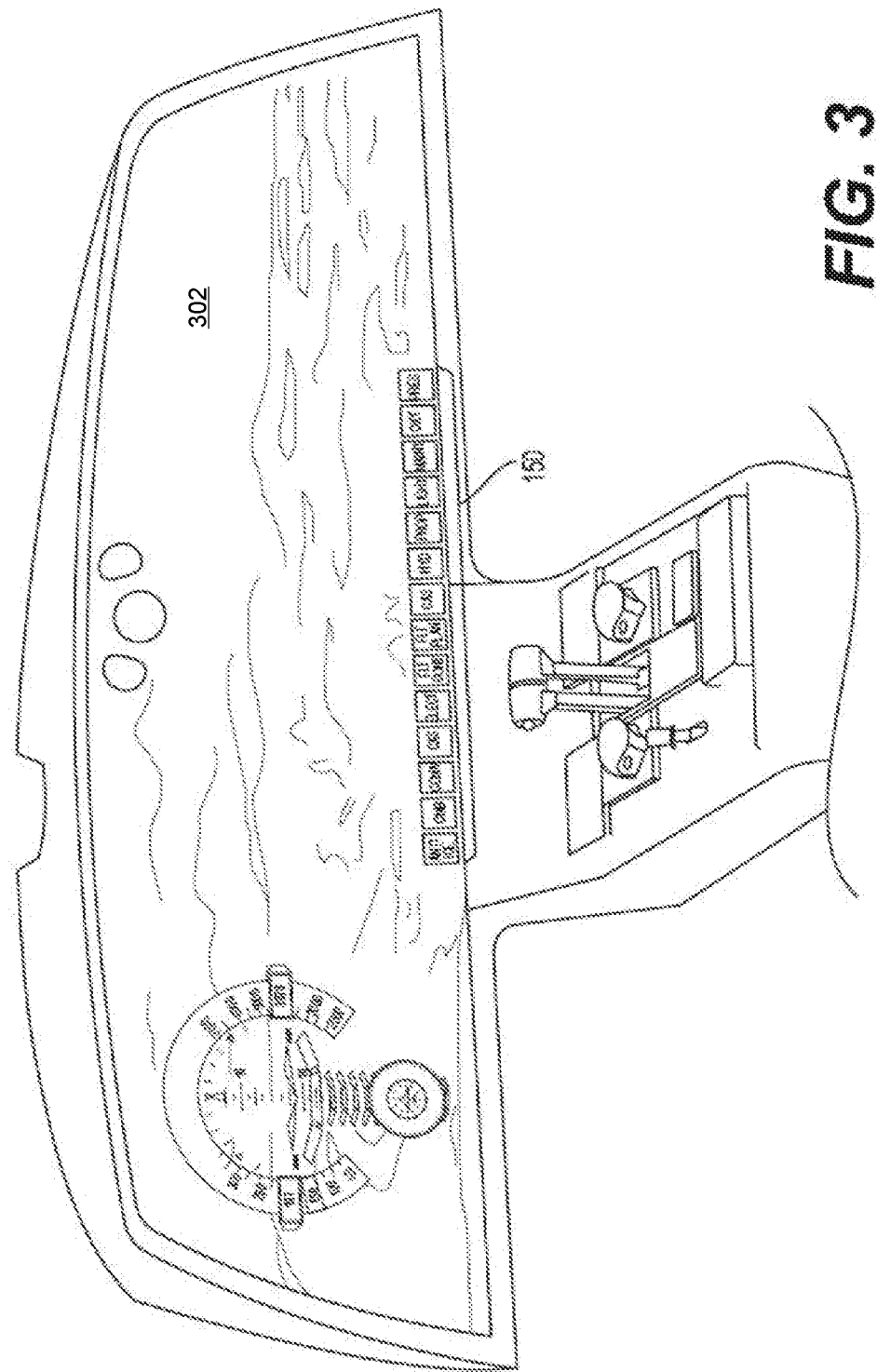
FIG. 3 depicts an embodiment of a touch-screen instrument panel system for an aircraft in a pre-alert state.

In embodiments, awareness-enhancing indications are communicated by displaying them on the touch screen instrument panel. In order to provide a frame of reference, FIG. 3 shows the touch screen instrument panel 100 in a pre-alert status before any warnings have been triggered. As can be seen, no windows are shown being opened up on the display 302, and the terrain image and other normal in-flight content are plainly visible. Further, none of the menu buttons 150 are presented in a way that distinguishes them from the others, other than identifying markings.

Figure 4:
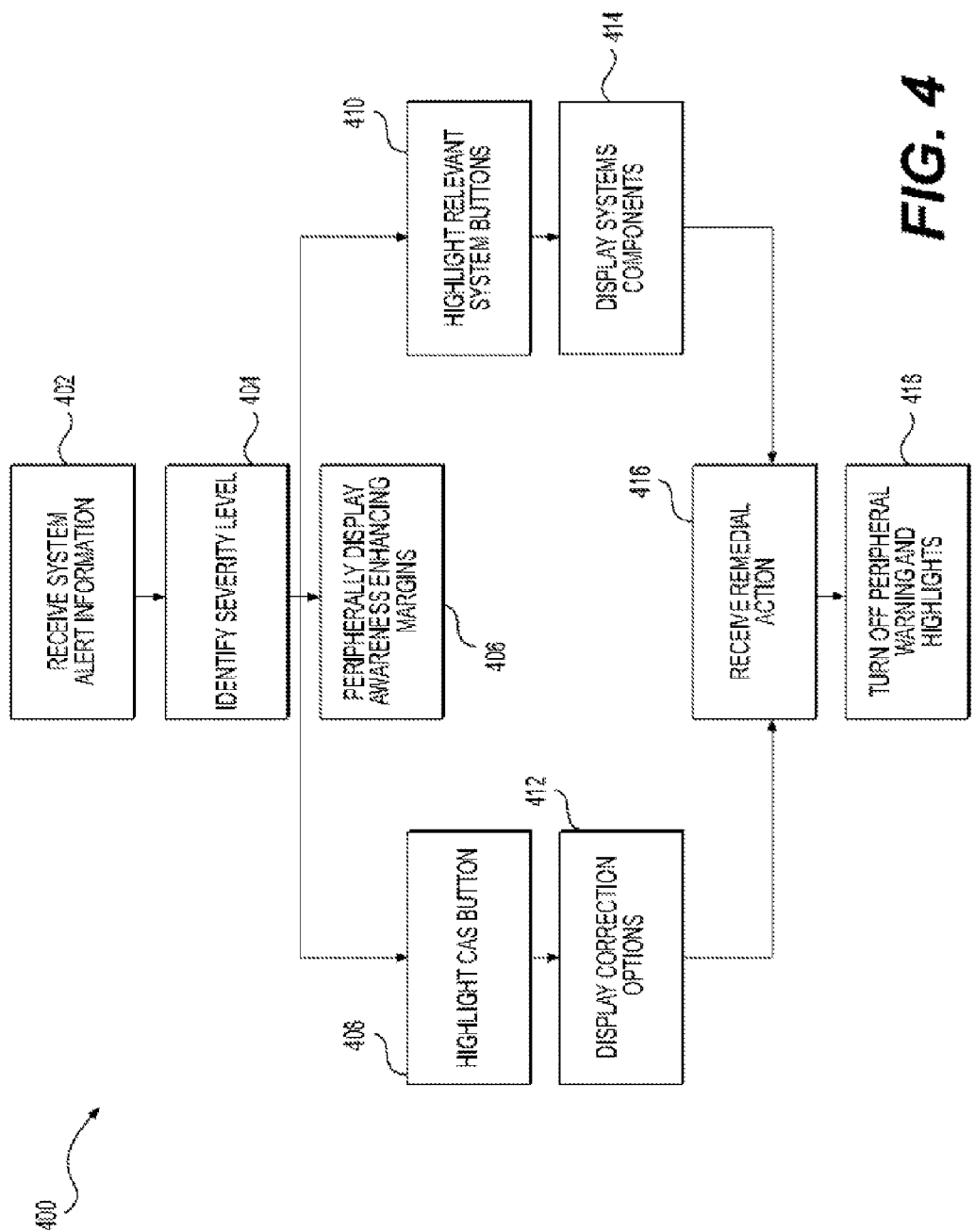
FIG. 4 depicts a flow diagram for an embodiment of the warning system useable with a touch screen instrument panel in an aircraft.

This changes, however, when an alert is received from the aircraft systems. Referring now to FIG. 4, a process flow diagram 400 is representative of alert processes which might be executed on the computer 201 to increase crew awareness. In a first step 402, alert information is received from an aircraft system. In one embodiment, this information might include either TCAS or TAWS information or alerts/warnings from component 280 (See FIG. 2). Alternatively, the message might be received from aircraft flight equipment 250 regarding, e.g. an issue regarding lighting, de-icing equipment, control surfaces, etc. The information could regard any of the aircraft systems shown in FIG. 2. Regardless of the source, the type of information, when received, is normally associated with a severity level. More specifically, a level of urgency in which some corrective measures should be taken. Thus, in a step 404, the level of severity of the information is identified. For example, four levels of severity might be employed. A first level of severity may be called "informational" and colored white for conditions that do not require flightcrew response, but are for informational purposes only. A second level of severity may be called "advisory" and colored cyan (or blue) for conditions that require flightcrew awareness and may require subsequent flightcrew response. A third level of severity may be called "caution" and colored amber (or yellow) for conditions that require immediate flightcrew awareness and subsequent flightcrew response. A fourth level of severity may be called "warning" and colored red for conditions that require immediate flightcrew awareness and immediate flightcrew response. These severity levels may be referred to as part of the aforementioned color coding scheme as will be discussed hereinafter.

In a Step 406, assuming the information regards an alert at a sufficient severity level, the computer 201 causes an awareness-enhancing indication, which, in an embodiment could be a peripheral display made to alert the crew of the existence of a warning. More specifically, in some embodiments, the display is made peripherally at one or more locations. In yet further other embodiments, the display is made substantially around the entire periphery of the touch screen as can be seen in the embodiment disclosed in FIG. 5.

Figure 5:
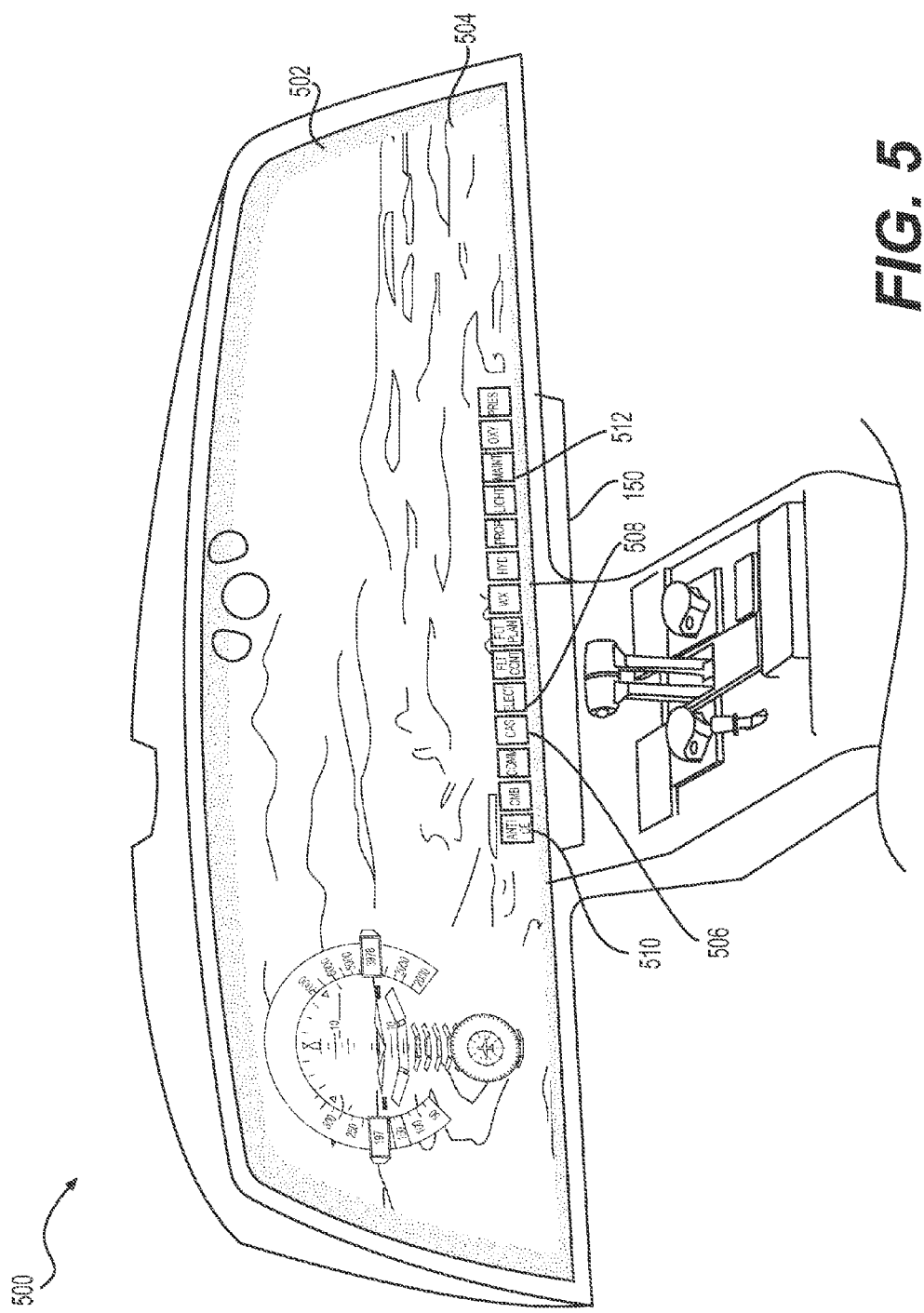
FIG. 5 depicts an embodiment of a touch-screen instrument panel system for an aircraft in a state where at least one alert is detected.

Referring to FIG. 5, it can be seen that the state of the panel shown in FIG. 3 has changed to include the peripherally displayed graphic 502. In one embodiment, the awareness-enhancing indication is color-coded, for example, red for an extreme emergency or warning, and amber or yellow for a less extreme emergency or caution. With respect to alert information that is at lower severity levels, a process running on computer 201 may result in no peripheral graphic being displayed at all. In further embodiments, a peripheral warning graphic displayed will pulsate to draw additional extra attention. It should be evident to those skilled in the art that various colors and attraction inducing measures could be selected in order to meet this objective. It should also be evident that because of the peripheral location of the warning indication, that the crew is able to clearly see and maintain the use of most of the display area 504, while at the same time, the indication pulsing and colored at the margins is impossible to miss.

In other embodiments, or in addition to, or instead of the margin-displayed indication, the awareness-enhancing indication is provided in the form of highlighting menu options. "Highlighting" or "highlighted" as used herein means that an item is made to be differentiated from other items, or otherwise modified to increase awareness relative to that item. The use of the term should not be interpreted as requiring any particular color or other further restrictive constructions unless otherwise specified.

In terms of the process embodiment disclosed in FIG. 4, it can be seen that a crew alert button 408 is subjected to highlighting. In terms of look-and-feel, FIG. 5 shows the crew alert button 506 as it might be highlighted on the menu 150 to enhance awareness (e.g., the crew will know that it is a menu item that should be selected to learn more about the problem, and also redress the problem).

Aside from the crew-alert button illumination (CAS) shown in 506 of FIG. 5 and shown as Step 408 in FIG. 4, a Step 410 causes the illumination of one or more system buttons (e.g., menu buttons 508 and 512, also in FIG. 5).

Each of these menu buttons 506, 508, and 512 can be highlighted in a number of different ways. In some embodiments, they are illuminated in a color that is the same of the particular warning level identified in Step 404. For example, for an extreme alert, a button might be illuminated in red—a color that those skilled in the art recognize as indicating a high level of seriousness. For less serious, but still important situations, the buttons might be illuminated in yellow. For moderately important situations the coloring might be blue, and for less serious items the coloring might be white.

Figure 6:
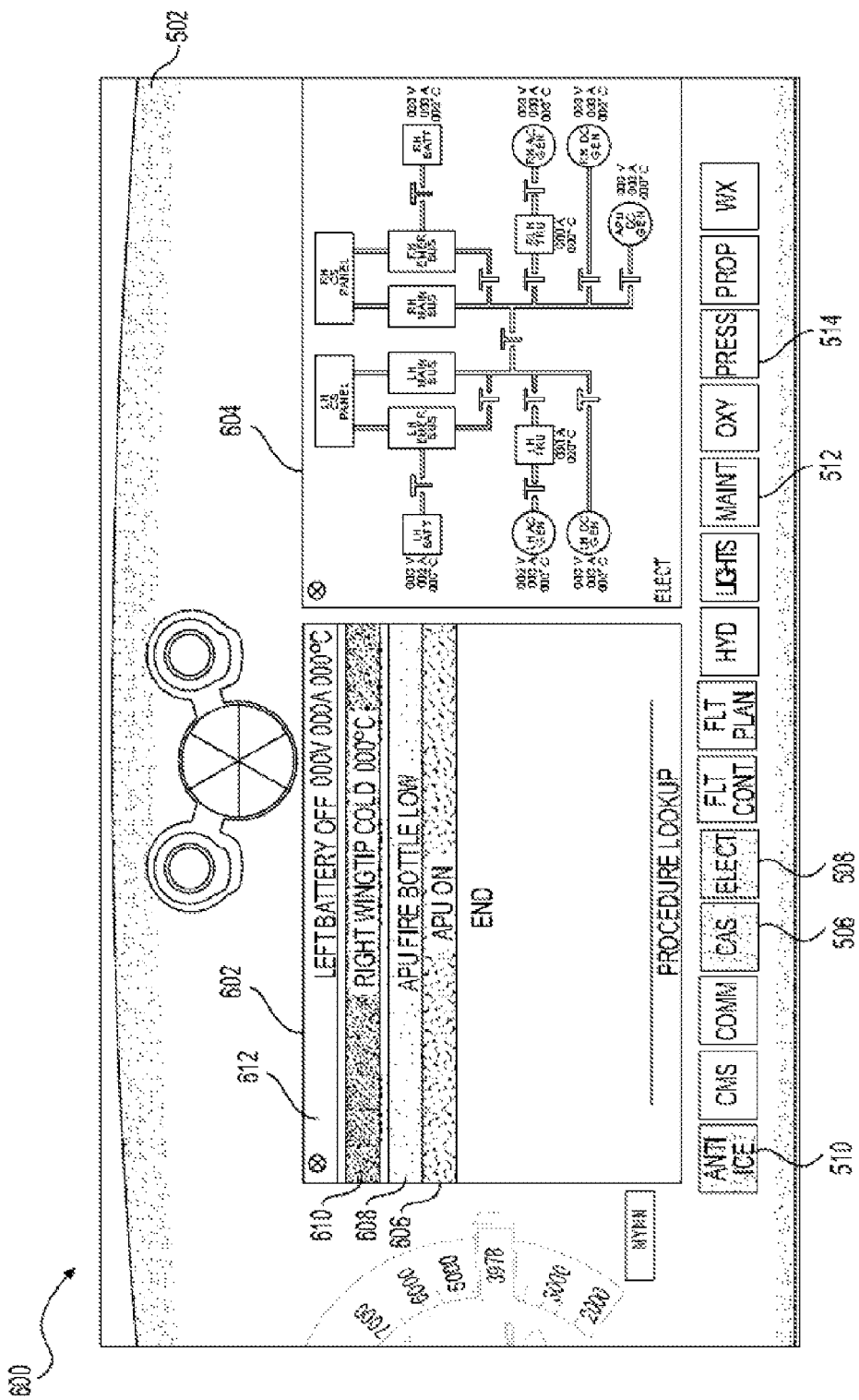
FIG. 6 depicts the panel where the crew-alert system and a system diagram window have been called up by a crew member.

Once a crew member identifies an alert exists as described wherein the peripheral area 502 is illuminated, in buttons 506, 508, and 512 are similarly highlighted by illumination, corrective measures can be taken. Button 508 "ELECT" provides, for example, electrical system schematic diagrams (see FIG. 8 and description below). Button 512 "MAINT" provides, for example, menu options for accessing maintenance issues (see FIG. 9 and description below). In order to assist the crew member in this regard, a step 412 provides that when a crew member selects the crew alert button 506, FIG. 6 shows that this will bring up a window 602 in a Step 412 where bars 606, 608, 610, and 612 are displayed. Each of bars 606, 608, 610, and 612 represents a system for which an alert exists.

Looking more closely at the crew alertness window 602, the window is initially presented in a collapsed format (as shown in FIG. 6), but is expandable. More specifically, if the user clicks on any of bars 606, 608, 610, and 612, existing in FIG. 6 can be expanded as shown in the screen 700 shown in FIG. 7. Note that sensed data is continuously displayed providing improved situational awareness for responding to a fault. For example, bar 610 includes a wingtip temperature reading and bar 612 includes battery voltage, current and temperature.

Figure 7:
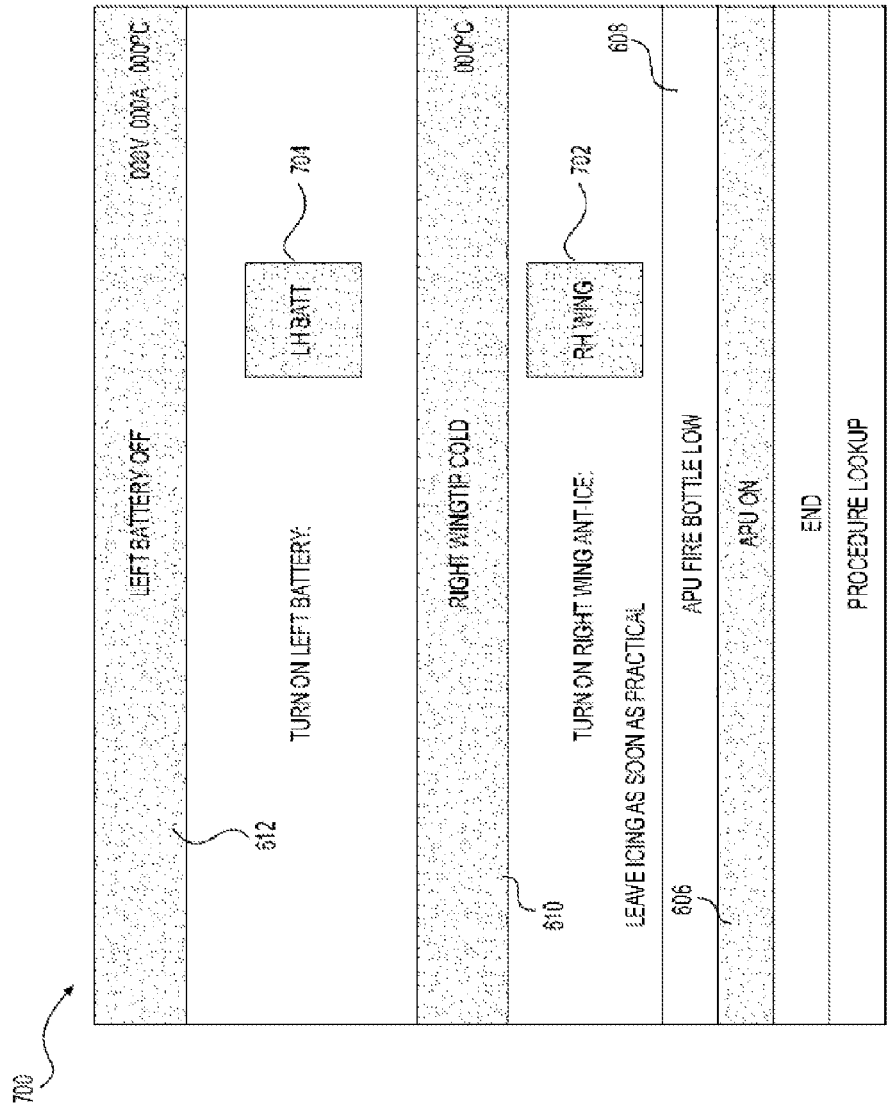
FIG. 7 depicts an embodiment for a crew-alert window which can be brought up by a crew person and used to rectify a condition needing attention.
Figure 8:
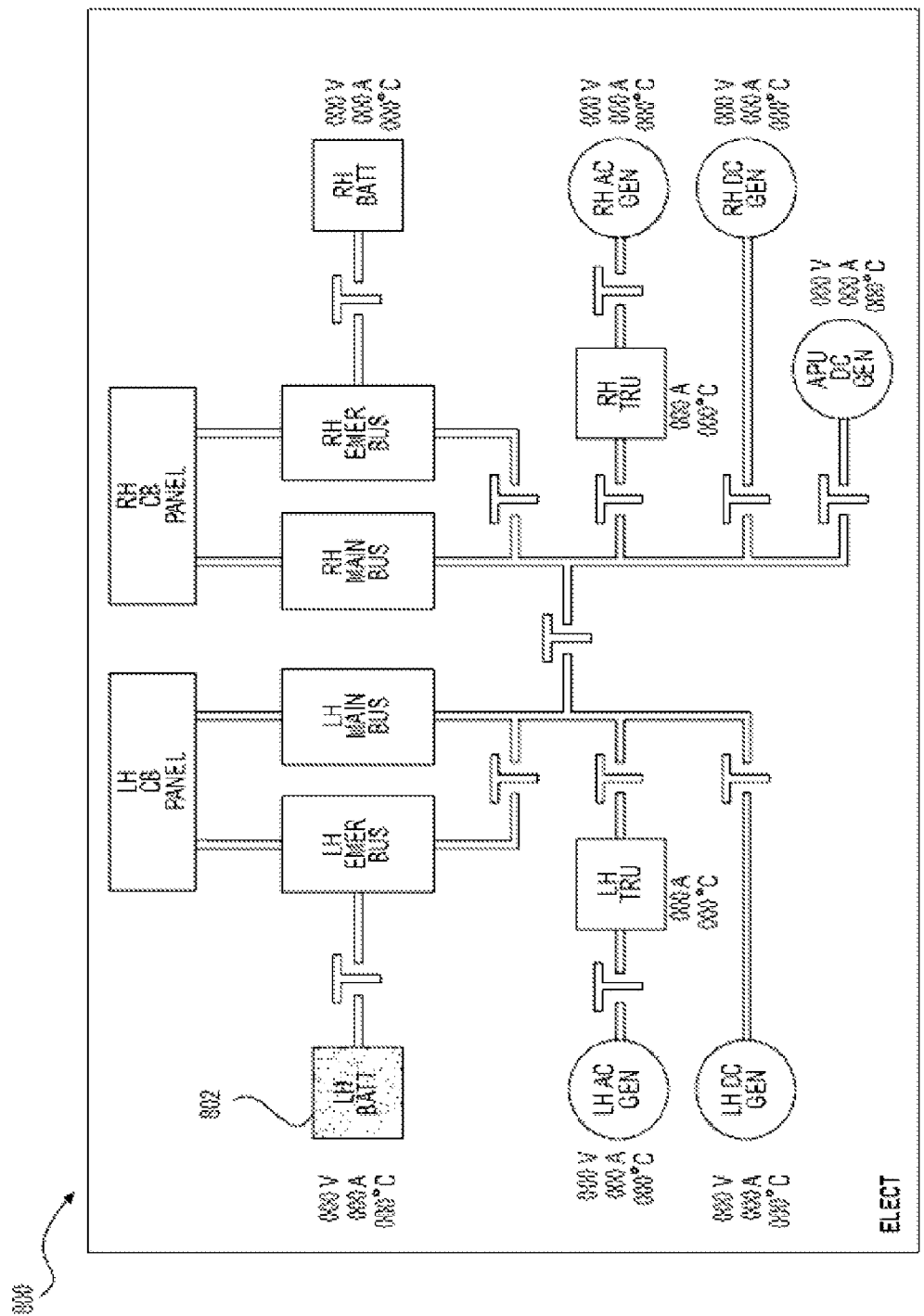
FIG. 8 depicts an embodiment for a synoptic window which can be brought up by a member of the crew to look at a device of concern.

Referring to FIG. 7, and moving from bottom to top, the "APU ON" bar 606, e.g., might be color coded white to represent a low priority state of alert. One bar up, the "APU FIRE BOTTLE LOW" Bar 608 might be colored blue to reflect a slightly more concerning alert level. Above that, a bar 610 for "RIGHT WING TIP COLD" is shown in expanded form, a user having selected it. Like with bars 606 and 608, bar 610, in the present embodiment, will be color coded with respect to severity level. For example, bar 610, in embodiments, could be colored yellow, reflecting a serious event, but not an emergency.

A crew member concerned about the warning is then able to click on, and thus expand bar 610, revealing means to correct the situation. Here, temperature sensors have detected a temperature, displayed in bar 610, that is below a predetermined setpoint. Thus, the expansion of bar 610 displays an appropriate solution, that being "TURN ON RIGHT WING ANTI-ICE" which is displayed next to a button 702 labeled with "RH WING". In embodiments, action button 702 will also be highlighted in the same color of warning indication (yellow) as has been used to lead the user through the process. If the crew member selects action button 702, the anti-ice equipment will be activated with respect to the right wing, thus correcting the problem of potential ice buildup.

Bar 612, labelled as "LEFT BATTERY OFF", would operate in much the same way. For example, it might also be displayed at its respective severity level, e.g. yellow here, indicating a serious situation needing to be dealt with, but not emergency situation. Note that bar 612 may include pertinent information, such as real-time data from sensor measurements for battery voltage, current and temperature, for example. When Bar 612 is expanded as shown in FIG. 7, an appropriate solution is displayed. For example, the user is told to "TURN ON LEFT BATTERY", and provided with a selectable field/button 704 (here "LH BATT") which when selected will turn the left battery back on, thus correcting the problem.

Procedurally speaking, the crew-alert processes enable the reaching of a solution to the warning by increasing awareness (leading the user through menus using color-coded highlighting). In FIG. 4, these processes are represented in a Step 412. Then, when the crew makes the corrective action, the process moves on to a Step 416 where the computer receives the remedial action due to the touch screen selection made (e.g., by activating either of buttons 702 or 704).

The crew is also offered an alternative approach to reaching the same solution. More specifically, given an alert, highlighting also directs the user to find a solution to the problem by looking at a particular system involved. As will be recalled, from the discussions involving FIG. 5, and at the same time reviewing FIG. 4, a step 410 causes the highlighting of one or more system items (e.g., menu buttons 506 and 510 also in FIG. 5) as is expressed in the process diagram of FIG. 4 as a step 414.

Upon the selection of highlighted menu item 508 (labeled as "ELECT" in FIG. 8), a window 604 will be called up (see FIG. 6). This window is shown in more detail in FIG. 8. Looking to FIG. 8, it is shown that a schematic of the electrical system is displayed. When the system screen 800 is presented, the particular component of interest will be highlighted. Here, the left-hand-side battery, or "LH BATT" 802 will be highlighted. In some embodiments, the highlighting will be in the color reflective of the warning level. For example, here, yellow just like with the crew-alert processes. If the crew member touches the "LH BATT"

button, the battery will be turned back on to correct the error. Thus, this is another alternative to direct a crew member to an appropriate solution by enhancing awareness. In other words, the system-focused processes expressed in steps 410 and 414 give the crew an alternative guided solution to reaching remedial step 416 aside from the crew-alert processes offered by following steps 408 and 412.

A similar process would also be afforded to a crew member in addressing the problem with the anti-icing system reflected by the highlighting of system button 510 (entitled "ANTI ICE"). Assuming that all the remedial actions have been taken, the computer will then turn off the peripheral warning and remove the highlighting in a Step 418.

Another aspect of the touch-screen instrument panel enables the bringing up of a graphical representation of at least one system component (e.g., possibly a device that is a part of the aircraft flight equipment 250, see FIG. 2), and then displaying information regarding a real-time value for an aircraft-parameter proximate the device relevant. The terms "graphical" or "graphic" as used herein should not be construed as requiring any particular level of vividness or realism. These terms mean simply that the graphic is identifiable as being a resemblance of something.

Figure 9:
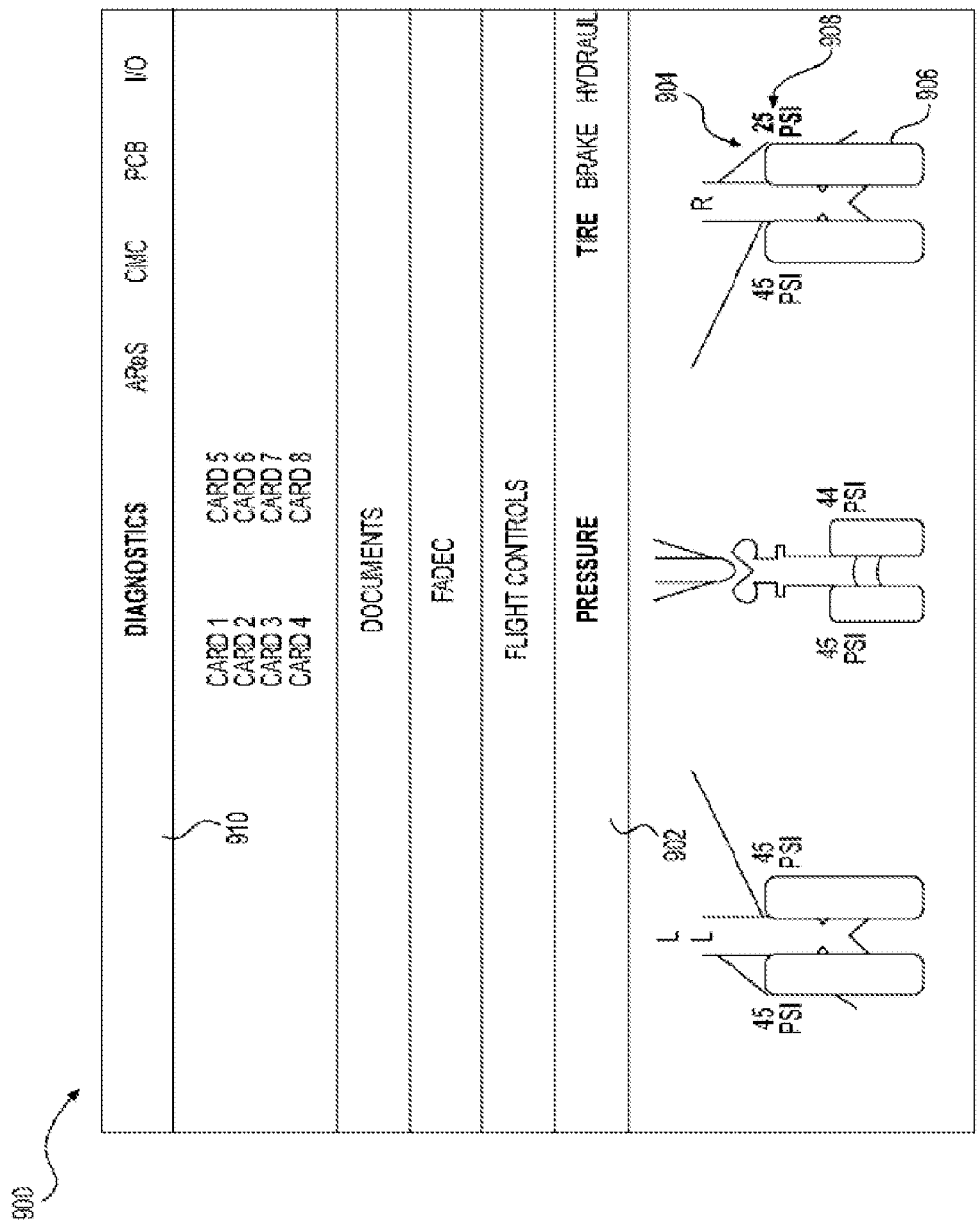
FIG. 9 depicts an embodiment for a maintenance window which reports real-time parameters and locates the values graphically at the positions of the components for which the readings are relevant.
Figure 10:
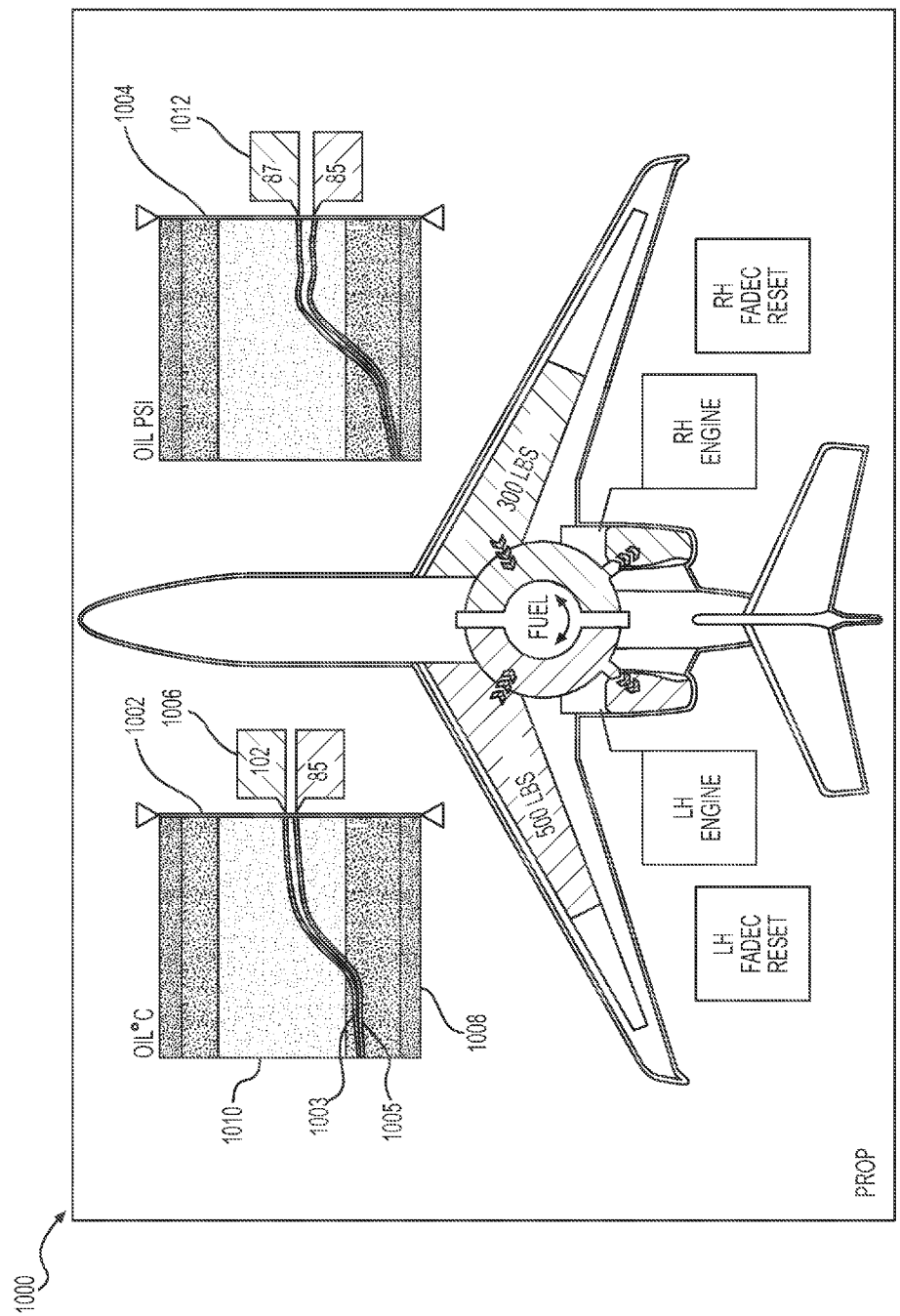
FIG. 10 depicts an embodiment for a window which can be opened up by a crew member, the window including readings of a parameter over time, thus, in a historical context.

Referring back to FIG. 5, it can be seen that a maintenance "MAINT" button 512 is shown. When a crew member activates this button, a window like that shown in FIG. 9 is displayed. On initial opening up, all four of the bars (e.g., 902 and the three above it) would all be in a collapsed state (see discussions regarding screen 602 in FIG. 6). FIG. 9, however, shows two of the bars (the "PRESSURE" and "DIAGNOSTICS" bars) have been expanded by the user. It can be seen that the "PRESSURE" bar 902 has been expanded to reveal a graphic representation of a nose wheel landing gear arrangement symmetrically paired between left and right landing gear. Additionally, the real-time values for tire pressures are shown for each tire in each tire tandem. These graphical representations make it very convenient for the user in that they are able to graphically associate the real-time parameter values (e.g., PSI) with the actual physical components in the proper orientation. For example, it can be seen upon looking at the right wheel 904, that a value 908 in the right outboard tire 906 is abnormally low (25 PSI versus the normal 45 PSI). The combination of real time parameter values (e.g., tire pressures) along with the physical representations of the components makes it easy for the user to identify the problem.

It should also be understood that this maintenance window can also be brought up as a result of an alert issued. This might occur, e.g., when a parameter value (e.g., PSI) is identified as being abnormally low (e.g., the value of 25 PSI value in tire 906). Referring back to the process diagram 400 shown in FIG. 4, an abnormal pressure level 908 detected in the left tire would trigger a warning from the aircraft systems. This warning would result in the highlighting of maintenance button 512 (according to step 410) and then, upon receipt of a selection of that button by a crew member, the maintenance window of FIG. 9 would be brought up. Bar 902 would, at that time, be collapsed, but would be highlighted in the relevant color (the same color, e.g., yellow, currently used in the highlighting of the menu item 512 and in the display of the margin warning 502). A click on the highlighted bar by a crew member, will expand the "PRESSURE" bar 902 revealing graphical representations of the wheel components as shown in FIG. 9. This gives the crew member an additional level of awareness regarding the relative orientations of actual physical device having the problem.

Additionally, the warning-causing parameter value display 908 and/or the particular device (e.g., tire 906) in which the abnormality is occurring are (in embodiments) highlighted in a color indicating the severity level of the alarm (and consistent with the color currently used in the highlighting of the menu item 512 and margin warning 502). The result is that a user, in face of a system abnormality, is quickly navigated to the source of the problem, and can easily identify the real-time value relevant to that problem.

Expanding of the "DIAGNOSTICS" bar 910 (as shown) gives the user the ability to examine the states of the inputs and outputs of various PC cards by selecting (i.e. touch) any of the particular cards listed. Additional maintenance items may be retrieved from the maintenance window along with document look-ups stored on databases 230. This feature provides an aircraft maintenance crew with improved access to relevant maintenance information.

In another aspect which enhances crew awareness, processes are provided which give the crew a historical context for parameter values. Referring to FIG. 5, selection of the "PROP" button brings up a screen 1000 shown in FIG. 10. Screen 1000 shows one of many other possible arrangements where real time values are displayed in a historical context. These values will be recorded over time by computer 201 utilizing a database (e.g., in one of a number of databases 230 in FIG. 2). Recorded and time-stamped values for parameters (e.g., pressures, temperatures) are then called up and continually displayed as is depicted in an oil temperature chart 1002 and an oil pressure chart 1004. In the embodiment disclosed, chart 1002 reflects two lines, a first plot 1003 representative of an oil temperature for the left hand engine over time, and a second plot 1005 representative of an oil temperature for the right hand engine over time. The real time current values 1006 are displayed as shown for chart 1002. Chart 1002 includes time on an X axis 1008, and includes the relevant parameter value (here, oil temperature) on a Y axis 1010.

Similarly, oil pressure chart 1004 enables the crew to see not only real-time values 1012, but also to view them in a historical context. The historical nature of these charts is beneficial because the crew member is able to see abnormalities not only in the real time value 1006, but also in the context of the past for those values.

Embodiments of the invention have been described to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed but, rather, the invention is to cover all modifications, alternative constructions, and equivalents falling within the spirit and scope of the invention.

It will be understood by those of ordinary skill in the art that the order of the steps recited herein is not meant to limit the scope of the present invention in any way and, in fact, the steps may occur in a variety of different sequences within embodiments hereof. Any and all such variations, and any combination thereof, are contemplated to be within the scope of embodiments of the present invention.

We claim:

1. A method of alerting an aircraft crew of a relevant condition, the method comprising:
   receiving information from an aircraft warning system regarding a condition;
   displaying an awareness-enhancing indication on a touch-screen display in an aircraft cockpit, the awareness-enhancing indication being communicated to a user, the indication suggesting a need to investigate the existence of the condition; and
   locating the awareness-enhancing indication about a substantial portion of a periphery of the display.

2. The method of claim 1 wherein the awareness-enhancing indication is presented substantially about the entire periphery of the display.

3. The method of claim 2 wherein the awareness-enhancing indication is presented at the margins of the display.

4. The method of claim 2 wherein the awareness-enhancing indication is displayed in a color, the color revealing a predetermined severity level for the condition.

5. A method of operating a touchscreen display in an aircraft, the method comprising:
   receiving information regarding a real-time value for an aircraft-parameter, the parameter being relevant to a condition in an aircraft system;
   displaying a window including graphic representative of the physical appearance of an aircraft component relevant to the parameter on the touchscreen display the graphic reflecting a symmetrical orientation and relative location of the component, the orientation and relative location enabling a user to select said component for correction of an abnormality based on the physical appearance, symmetrical orientation, and relative location; and
   communicating the real-time value of the aircraft-parameter to a user proximate the graphic.

6. The method of claim 5 wherein an awareness-enhancing indication regarding the abnormality regarding the real-time value of the aircraft-parameter is communicated by causing an alert button to one of: (i) illuminate; (ii) be subjected to a change in color; or (iii) blink when, and then when said button is selected, the selection directs a user to the graphic.

7. The method of claim 5 wherein the graphic representative of an aircraft component includes one of (i) a wheel, (ii) an engine, (iii) a fuel tank, or (iv) a wing.

8. A method for increasing crew awareness, the method comprising:
   offering a plurality of menu items on a display in an aircraft cockpit, each of the menu items relating to a particular aircraft system;
   generating a first awareness-enhancing indication on a first menu item of said plurality, the first menu item being associated with a first aircraft system, and the first indication being in response to a first alert regarding a first condition, the first condition regarding a first real-time value of a first parameter relating to the first system on the aircraft; and
   highlighting the first menu item; and,
   enabling, upon a first selection being made of the first menu item, an automatic bringing up of a first window displaying a first corrective option for changing the first condition in the first system.

9. The method of claim 8 wherein the window automatically displays at least one action button which, when selected, makes the change intended to correct the first condition in the first aircraft system.

10. A method of operating a touchscreen display in an aircraft, the method comprising:
    receiving information regarding a real-time value for an aircraft-parameter, the parameter being relevant to a condition in an aircraft system; and
    communicating the real-time value of the aircraft-parameter onto a display in the aircraft in a historical context continually displaying the real-time value while time stamping and saving a plurality of historical values, and displaying the historical values behind the continually displayed real-time value.

11. The method of claim 10 wherein the historical context is presented as a gauge on a touch-screen instrument panel in the aircraft.

12. The method of claim 11 wherein the time-line representation is made using a chart wherein a time value is on one axis, a history of values is on a second axis, and the real time value of the aircraft parameter is continually plotted as the aircraft operates.

13. A system comprising:
    a touch-screen device incorporated into an aircraft having a cockpit;
    the touch-screen device being arranged to interface with a computing system on the aircraft;
    the computing system being configured to receive information regarding a parameter relating to a condition in one of an electrical or a mechanical system on the aircraft;
    a first process operating on the computer system, the process being configured to display a system identifying graphic related to the condition on the touch-screen device;
    a second process operating on the computer system, the second process being configured to present an action selection graphic that when selected institutes a corrective action with respect to an aircraft component regarding the condition by interfacing with an aircraft system relating to the component.

14. The system of claim 13 comprising:
    a database on the aircraft, the database enabling the recording of a series of aircraft-system parameter values over time and saving the values on a database on the aircraft;
    a third process operating on the computer system, the third process causing a time-line representation of the values on the touchscreen display to provide a historical context to a user.

15. The system of claim 13 wherein the first process results in the system-identifying graphic being presented in a way such that the graphic represents a physical embodiment of the system in which the condition exists.

16. The system of claim 13 wherein the first process generates the system identifying graphic in the form of a warning about the periphery of the display.

17. The system of claim 13 wherein the first process generates a color-coded warning, wherein the color reveals a predetermined severity level for the condition.

18. The system of claim 13 wherein:
    the computing system is configured to receive the information regarding the parameter from one of a: (i) Traffic Collision Avoidance System (TCAS), or (ii) a Terrain Awareness Warning System (TAWS).

19. The system of claim 13 comprising:
    a fourth process operating on the computing system, the fourth process enabling the generation of a window on the display in response to the condition, the window displaying an option for changing the condition.

20. The method of claim 1 wherein the awareness-enhancing indication pulses in an attention attracting manner.

21. The method of claim 1 wherein the awareness-enhancing indication at least partially surrounds a real-time image that displays a view from ahead of the aircraft.

22. The method of claim 1 comprising:
installing the touchscreen display in the aircraft to span a substantial portion of a width of the cockpit and serve as a replacement for a substantial number of conventional instruments and displays.

23. The method of claim 8 comprising:
generating a second awareness-enhancing indication on a second menu item of said plurality, the second menu item relating to a second aircraft system;
the second awareness-enhancing indication occurring in response to a second alert regarding a second condition, the second condition regarding a second real-time value of a parameter relating to the second system on the aircraft; and
highlighting the second menu item, the second menu item enabling, upon making a selection of the second menu item, automatically bring up a window displaying a second option for changing the second condition in the second system.

24. The method of claim 10 wherein the real-time value exists on a right-hand side of the timeline, and a numerical value is displayed on the right-hand side.

\* \* \* \* \*